(12) United States Patent
Sadri et al.

(10) Patent No.: US 7,460,876 B2
(45) Date of Patent: Dec. 2, 2008

(54) SYSTEM AND METHOD FOR INTELLIGENT TRANSMITTED POWER CONTROL SCHEME

(75) Inventors: Ali S. Sadri, San Diego, CA (US); Alexander A. Maltsev, Nizhny Novgorod (RU); Alexey E. Rubtsov, Nizhny Novgorod (RU); Vadim S. Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/330,675

(22) Filed: Dec. 30, 2002

(65) Prior Publication Data

US 2004/0127245 A1 Jul. 1, 2004

(51) Int. Cl.
*H04B 7/00* (2006.01)
*H04Q 7/20* (2006.01)

(52) U.S. Cl. ............... 455/522; 455/517; 375/260; 375/265; 370/203; 370/211

(58) Field of Classification Search ............ 455/412.2, 455/522, 562, 446, 517; 375/343, 346, 347, 375/260, 265; 370/208, 203, 211; 342/368
See application file for complete search history.

(56) References Cited

U.S. PATENT DOCUMENTS

| | | | | |
|---|---|---|---|---|
| 3,794,978 | A * | 2/1974 | Staron | 340/170 |
| 4,355,408 | A * | 10/1982 | Scarrott | 375/360 |
| 5,553,102 | A * | 9/1996 | Jasper et al. | 375/347 |
| 6,160,791 | A * | 12/2000 | Bohnke | 370/208 |
| 6,345,036 | B1 * | 2/2002 | Sudo et al. | 370/203 |
| 6,747,945 | B2 * | 6/2004 | Sudo et al. | 370/203 |
| 6,928,120 | B1 * | 8/2005 | Zhang | 375/260 |
| 6,983,173 | B2 * | 1/2006 | Miyatani | 455/562.1 |
| 2001/0028637 | A1 * | 10/2001 | Abeta et al. | 370/335 |

(Continued)

FOREIGN PATENT DOCUMENTS

EP  1 037 303  9/2000

(Continued)

OTHER PUBLICATIONS

Chow P. Cioffi J., Bingham J., "A proactical disctete multitone transceiver lading algorithm for data tranmission over spectrally shaped channels", IEEE Transactions on Communications, V. 43, No. 2/3/4, Feb./mar./Apr./ 1995, pp. 773-775.

(Continued)

*Primary Examiner*—Nay Maung
*Assistant Examiner*—Tuan H Nguyen
(74) *Attorney, Agent, or Firm*—Pearl Cohen Zedek Latzer, LLP

(57) ABSTRACT

Briefly, an adaptive transmitted power control scheme, which may be used in stations of a communication system, for example, a wireless communication system. The scheme may allocate transmission power to a communication station based on multiplying each of at least one transmitted subcarrier complex number by a corresponding subcarrier weight. Additionally, a detection scheme may detect whether a transmitted power control scheme according to an embodiment of the invention is used by stations of the communication system. The allocation of transmission power may be also used to transmit additional service information through channels.

23 Claims, 11 Drawing Sheets

U.S. PATENT DOCUMENTS

| | | | |
|---|---|---|---|
| 2002/0027875 A1 | 3/2002 | Sudo et al. | |
| 2002/0060990 A1* | 5/2002 | Bohnke et al. | 370/270 |
| 2003/0017852 A1* | 1/2003 | Miyatani | 455/562 |
| 2003/0026360 A1* | 2/2003 | Ramasubramanian | 375/343 |
| 2003/0048856 A1* | 3/2003 | Ketchum et al. | 375/260 |
| 2004/0127223 A1* | 7/2004 | Li et al. | 455/446 |
| 2004/0156456 A1* | 8/2004 | Wu et al. | 375/346 |
| 2004/0203626 A1* | 10/2004 | Esmailzadeh et al. | 455/412.2 |

FOREIGN PATENT DOCUMENTS

| | | |
|---|---|---|
| EP | 1 207 551 | 5/2002 |

OTHER PUBLICATIONS

Fisher R., Huber J., "A new loading algorithm for discrete multitone transmission", Proc. IEEE Globecom 96, p. 724-728.

Krongold B., Ramchandran K., Jones D., "Computationally efficient optimal power allocation algorithm for multicarrier communication systems", IEEE, 1998, pp. 1018-1022.

International Search Report from PCT/US03/41430, dated Aug. 27, 2004.

* cited by examiner

SYSTEM AND METHOD FOR INTELLIGENT TRANSMITTED POWER CONTROL SCHEME

BACKGROUND OF THE INVENTION

In the fields of wireless communications with Orthogonal Frequency Division Multiplexing (OFDM) and/or Discrete Multitones (DMT), stations may communicate among themselves by sending and receiving data packets, in accordance with various standards known in the art, for example, IEEE standard 802.11a.

When stations communicate over a frequency-selective channel, the data transferred generally contains errors. Such data errors are typically measured by BER (Bit Error Rate) units or PER (Packet Error Rate) units. At present, a station usually does not operate at optimal or near-optimal overall BER/PER.

BRIEF DESCRIPTION OF THE DRAWINGS

The present invention will be understood and appreciated more fully from the following detailed description of preferred embodiments of the invention taken in conjunction with the accompanying drawings in which.

DETAILED DESCRIPTION OF THE INVENTION

Embodiments of one aspect of the present invention provide a device and/or a method to enable a communication station to operate at optimal, near optimal, or minimal overall BER and/or PER.

Embodiments of another aspect of the present invention provide a device and/or a method to detect usage of a BER and/or PER optimizing/minimizing solution.

Embodiments of the present invention introduce a novel adaptive Intelligent Transmitted Power Control (ITPC) scheme. Although the scope of the present invention is not limited in this regard, the ITPC scheme may be used in conjunction with various types of wireless communication systems, for example, systems operating in accordance with predefined standards, for example IEEE standard 802.11a, or other OFDM or DMT systems, including, but not limited to, systems that use multiple carriers and/or subcarriers simultaneously.

Figure 1:
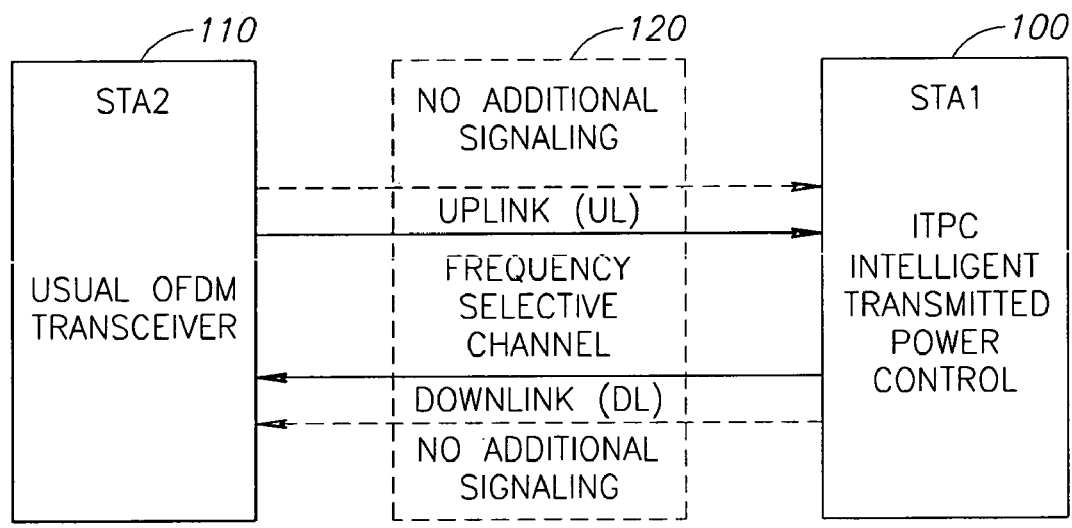
FIG. 1 is a schematic illustration of a communication system including an Intelligent Transmitted Power Control (ITPC) scheme in accordance with exemplary embodiments of the invention.

FIG. 1 schematically illustrates a communication system, which may be used in conjunction with exemplary embodiments of the present invention. The system may include two stations, namely STA1 (denoted 100) and STA2 (denoted 110), respectively, operating (for example, communicating) over a frequency-selective channel 120. Such a channel may be benign or slow-varying, for example, the channel may be a frequency-selective channel with a relatively small channel deviation (e.g., up to 3 to 6 dB). In such a communication system, forward and reverse channels may be symmetrical and reciprocal during single packet interchange between stations. Each of stations 100 and 110 may include a transceiver, as described in detail below. Although the scope of the present invention is not limited in this regard, the system of an embodiment of the invention may be a "blind as a bat" type system, namely, a system in which all information exchanged or transmitted is in accordance with the communications standard being used.

In one exemplary embodiment of the present invention, station 100 may initially estimate channel quality and subcarrier power gains, using a signal received from station 110. Based on these estimations, station 100 may perform optimal or near-optimal power allocation through subcarriers for transmission. In an embodiment of the present invention, the power allocation or reallocation may be performed, for example, with a constraint that the total transmission power remains substantially constant. The term allocation, as defined herein, may also refer to reallocation of power. Reallocation of power in accordance with embodiments of the invention may adjust an initial power allocation, or to adjust a previous power reallocation, of the transmissions of stations 100 and 110.

Although the scope of the invention is not limited in this respect, station 100 may use the same type of modulation and coding technique in substantially all data subcarriers. In some embodiments of the invention, more power may be allocated to subcarriers with lower channel power gain ("bad" subcarriers) than to subcarriers with higher channel power gain ("good" subcarriers). Such allocation may be performed using methods as detailed herein, to achieve local subcarrier equalization of Signal-to-Noise Ratio (SNR) in the receiver of station 110. This power allocation scheme may be optimal or near-optimal in terms of overall BER/PER minimization or, conversely, total average throughput maximization.

Figure 2:
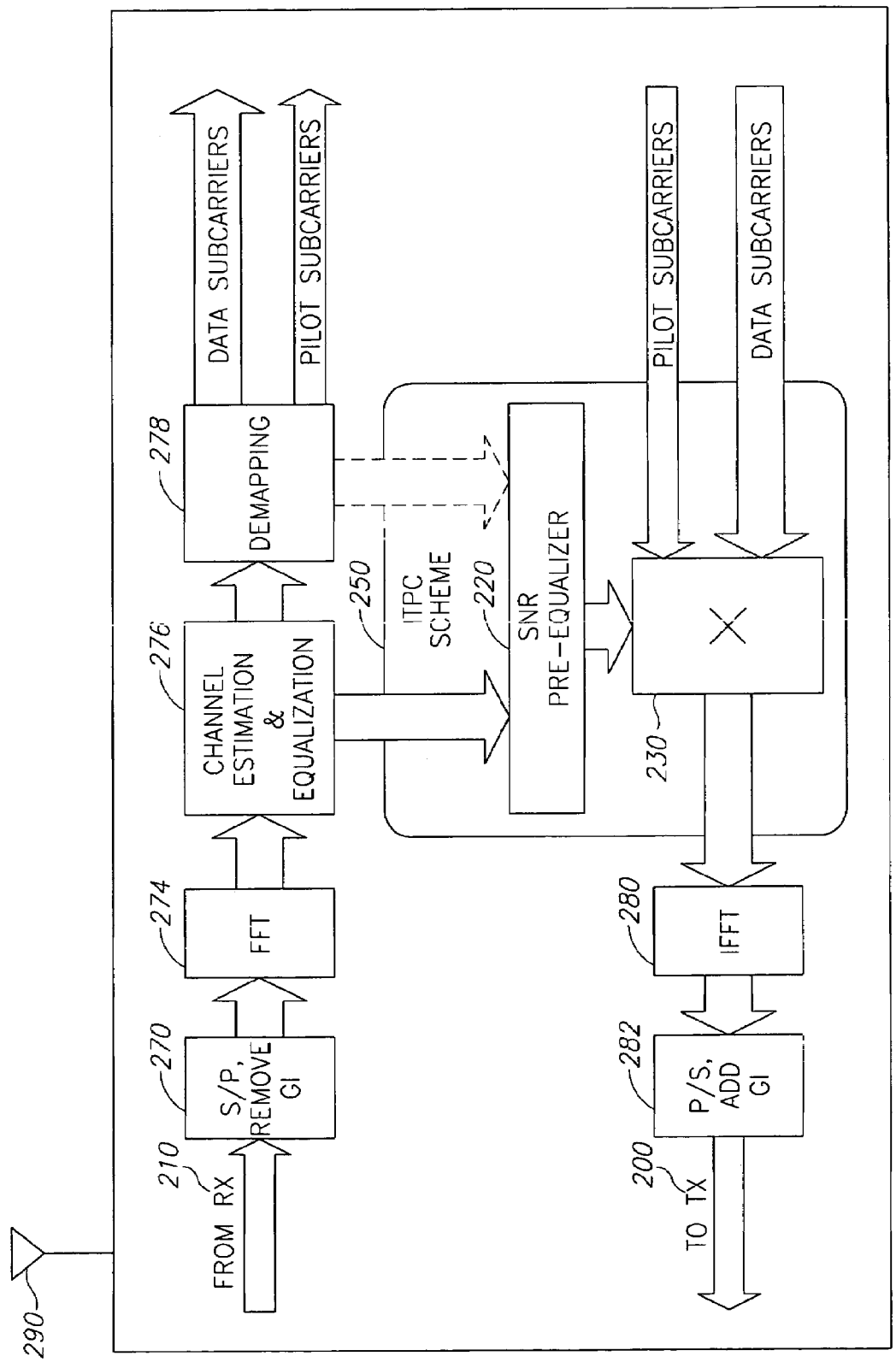
FIG. 2 is a schematic functional block diagram of an OFDM standard 802.11a transceiver with an ITPC scheme in accordance with exemplary embodiments of the invention.

FIG. 2 schematically illustrates a functional block diagram of an OFDM standard 802.11a transceiver with an ITPC scheme 250 according to exemplary embodiments of the invention. ITPC scheme 250 may operate between a transmitter (TX) part 200 and a receiver (RX) part 210 of station 100, which may include any components of a transceiver, as are known in the art, in addition to the components specifically described herein. The ITPC scheme 250 may include a local subcarrier SNR Pre-Equalizer 220, and a Subcarrier Weighting Unit 230, either or both of which may be implemented using any combination of hardware and/or software as may be desired. RX part 210 may receive a packet from another station, e.g., station 110. Then, SNR Pre-Equalizer 220 may switch the ITPC scheme 250 "on" or "off", and may calculate weights for the TX part 200 using any suitable weight calculation method known in the art.

During transmission of a packet to another station, e.g., station 110, Subcarrier Weighting Unit 230 may generate output signals, which may be based on multiplying subcarrier weights calculated in SNR Pre-Equalizer 220 by corresponding subcarrier complex numbers, which may represent constellation points from a mapping block. As illustrated in FIG. 2, the system may include and use other components as are known in the art; for example, RX part a Serial-to-Parallel (S/P) converter and Remove Guards Intervals (RGI) unit 270, a Fast Fourier Transform (FFT) 274, a Channel Estimation & Equalization unit 276, and a Demapping unit 278, and TX part 200 may include an Inverse FFT (IFFT) 280, and a Parallel-to-Serial (P/S) converter and Add Guards Intervals (AGI) unit 282, all of which units may include hardware and/or software components as are known in the art. Additionally, the system may include and use an internal and/or external Antenna 290.

Figure 3:
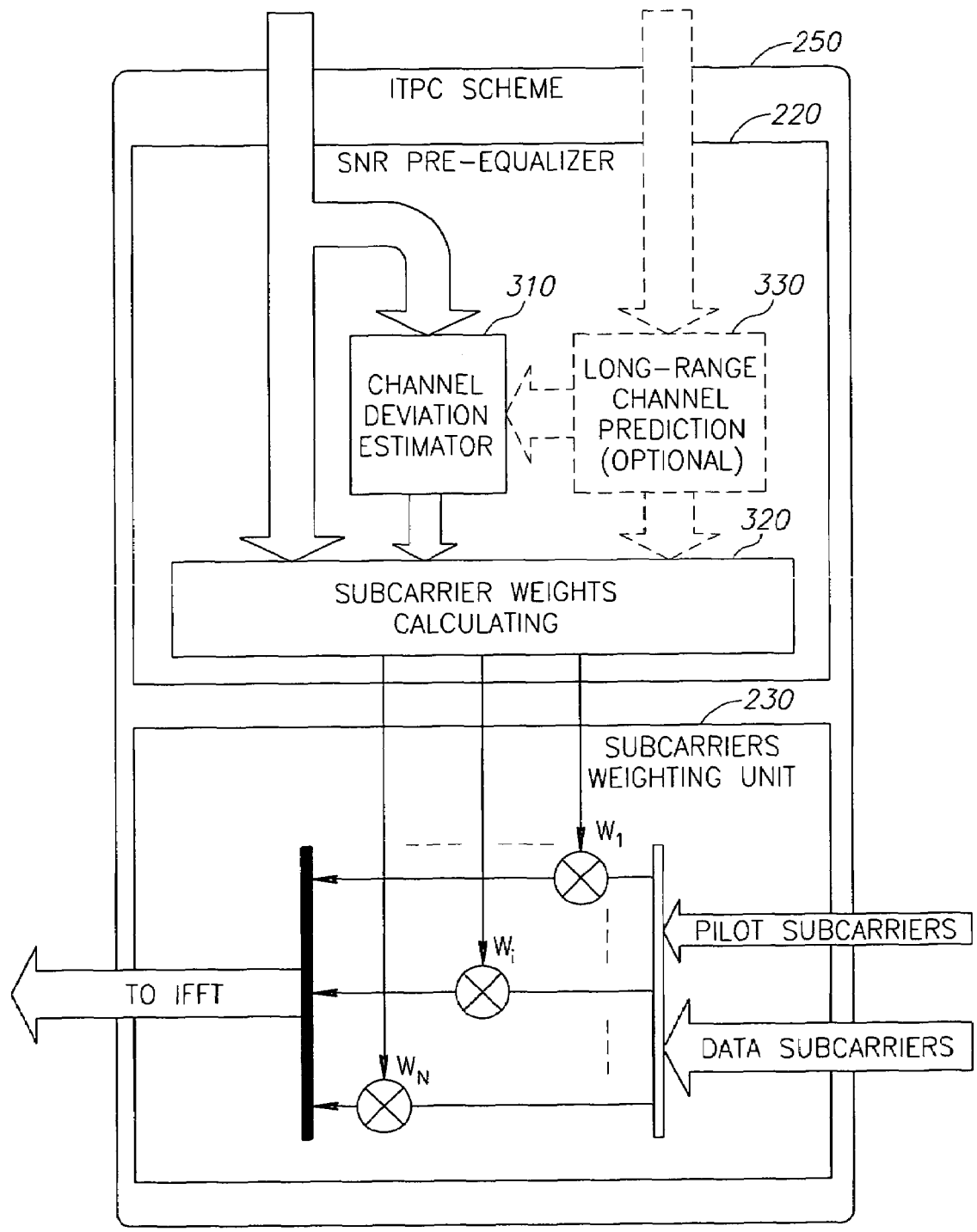
FIG. 3 is a schematic functional block diagram showing the ITPC scheme of FIG. 2 in more detail.

FIG. 3 schematically illustrates in more detail a functional block diagram of the ITPC scheme 250 and its units, e.g., the SNR Pre-Equalizer 220 and the Subcarrier Weighting Unit 230. SNR Pre-Equalizer 220 may include a Channel Deviation Estimator 310, a Subcarrier Weights Calculating Sub-unit 320 and, optionally, a Long-Range Channel Prediction Sub-unit 330.

The Channel Deviation Estimator 310 may calculate an instantaneous value of channel deviation. In order to achieve this, the magnitudes of substantially all subcarriers fading gains may be compared, and a ratio of maximal gain magnitude to minimal gain magnitude may be determined. This ratio may be referred to as "channel deviation".

The channel deviation value may be compared with a given threshold, which may determine channel quality. In some embodiments of the present invention, the threshold value may be pre-determined in accordance with theoretical calculations and/or simulations. The threshold value may be pre-stored in an optional memory device or buffer (not shown), or may be built-in or hard-coded into the method being used for power allocation in accordance with the present invention. Although the scope of the present invention is not limited in this regard, it is noted that theoretical calculations and simulations have shown that the ITPC scheme in accordance with some embodiments of the present invention may improve performance for channel deviation of up to 6 dB. It is further noted that embodiments of the present invention may use this particular or other threshold values, and that, for example, with a non-benign channel which has a relatively high channel deviation, other schemes of adaptive bit and power allocation may be used.

If the channel deviation value exceeds the threshold, then the ITPC scheme 250 may be switched "off", and the Subcarrier Weights Calculating Sub-Unit 320 may generate substantially all units (i.e., "1"s) for the subcarrier weights, such that the subcarrier weights values do not affect the signal being communicated. However, if the channel deviation value is below the threshold, the ITPC scheme 250 may be switched "on" and the Subcarrier Weights Calculating Sub-unit 320 may operate.

The Subcarrier Weights Calculating Sub-unit 320 may define subcarrier weights such that higher weights are assigned to subcarriers with smaller channel gains, and smaller weights are assigned to subcarriers with larger channel gains. In some embodiments of the present invention, the Subcarrier Weights Calculating Sub-unit 320 may use inverse subcarriers fading gains estimates (ISFGE) from a standard OFDM channel equalization unit. In other embodiments of the present invention, the Subcarrier Weights Calculating Sub-unit 320 may use subcarriers fading gains estimates (SFGE) from a standard OFDM channel equalization unit. It is noted that in order to satisfy total transmitter power requirements, the sum of the squares of the subcarrier weight magnitudes may be constant and equal to the number of subcarriers.

An optional Long-Range Channel Prediction Sub-unit 330 may be used, for example, when the environment in which the stations operate is varying, or when dynamic channel variation during receiving of a current packet is relatively large. In such cases, during receiving of a current packet, the Long-Range Channel Prediction Sub-unit 330 may predict subcarriers fading gains, by using algorithms as are known in the art. Then, the Long-Range Channel Prediction Sub-unit 330 may send information to the Channel Deviation Estimator 310 and the Subcarrier Weights Calculating Sub-unit 320, which output signals (i.e., weights) may be calculated taking into account predicted subcarriers fading gains during a packet transmission.

FIG. 3 further depicts Subcarriers Weighting Unit 230, which may receive input signals, including subcarrier weights from SNR Pre-Equalizer 220, pilot subcarriers complex numbers, and data subcarriers complex numbers from a standard OFDM subcarrier modulation mapping unit (not shown). The Subcarriers Weighting Unit 230 may multiply the subcarriers complex numbers by their corresponding subcarrier weights provided by the SNR Pre-Equalizer 220. The resulting weighted subcarrier complex numbers may be received by an IFFT unit 280, which may include an IFFT as is known in the art.

Figure 4:
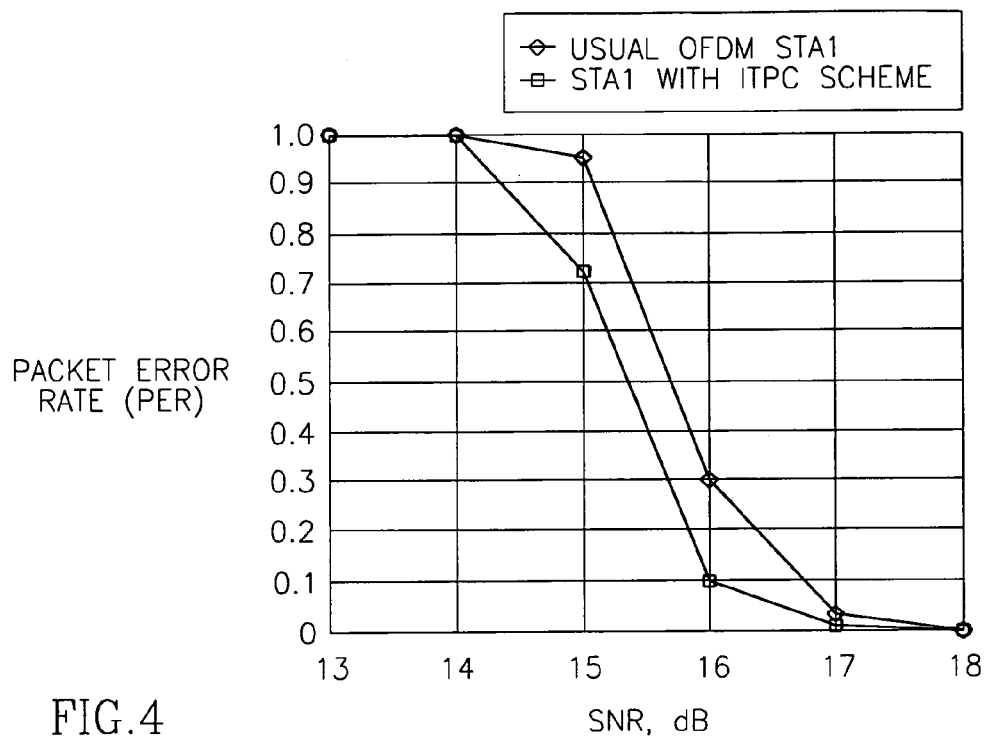
FIGS. 4 and 5 are schematic graphs illustrating simulation results for OFDM transceivers using an ITPC scheme in accordance with exemplary embodiments of the invention.
Figure 5:
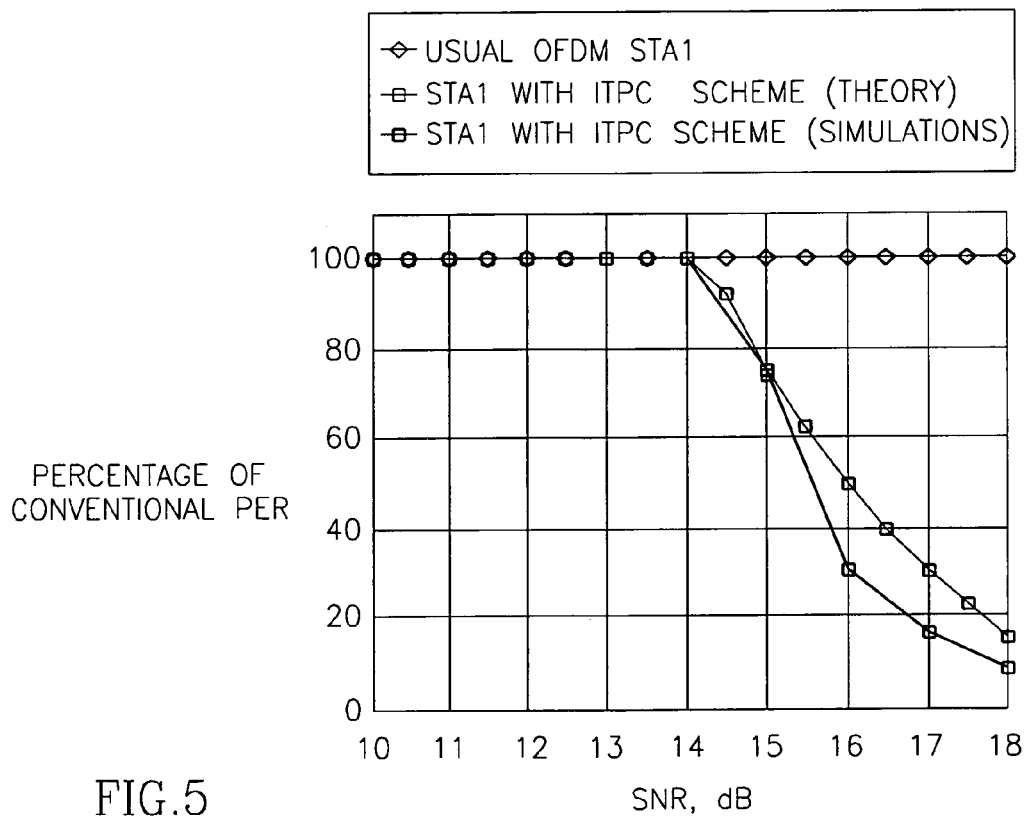

Analytical and simulation results confirm that when one station, e.g., STA1, uses the ITPC scheme described above, the BER and/or PER value may decrease in the other station, e.g., STA2, in comparison to conventional OFDM transmission. For example, FIG. 4 and FIG. 5 present simulation results for OFDM transceivers with a data rate of 36 Megabits/second, a 16-QAM modulation type, a coding rate of ¾, and a packet length of 1,000 bytes. Such simulations may be performed for a reciprocal, two-ray (e.g., with inter-ray delay of 50 nanoseconds and relative power of −15 dB), static, frequency-selective channel model, e.g., a benign channel with a channel deviation value of D=3 dB. FIG. 4 shows absolute values of PER performance of the RX of STA2 when STA1 uses the ITPC scheme of some embodiments of the present invention. FIG. 5 shows curves of PER values, which may be obtained from simulations of embodiments of the invention, compared to theoretical PER values for an ITPC scheme in accordance with some embodiments of the invention. For instance, it may be observed that for packets sent to. STA2 with SNR ranging from 16 dB to 18 dB, an ITPC scheme according to some embodiments of the invention may reduce PER by more than 50 percent.

Although the scope of the present invention is not limited in this respect, it is noted that an ITPC scheme in accordance with embodiments of the present invention may have, at least, the following benefits:

(a) Near optimal overall BER/PER in STA2 receiver, when STA1 and STA2 operate over a benign, slowly varying, reciprocal frequency-selective channel.

(b) No additional information, except for standard data, needs to be transmitted between STA1 and STA2, thereby enabling "blind as a bat" power allocation scenarios.

(c) Low complexity of the ITPC scheme allows using the scheme strictly in a predefined standard framework, e.g., OFDM/IEEE 802.11a communications, if desired, and using the same type of modulation and coding technique in substantially all data subcarriers.

(d) If STA1 and STA2 operate over a fast-varying channel with deep fading, e.g., a channel with relatively large channel attenuation, which may be caused, for example, by multipath signal propagation, then the ITPC scheme of some embodiments of the invention may be switched "off", and the performance of the RX part of STA2 may not degrade.

An aspect of some embodiments of the present invention introduces an ITPC Detector that may detect a station using an ITPC scheme, for example, a licensed and/or a non-licensed ITPC scheme according to embodiments of the present invention, as described above. Additionally, the ITPC Detector may detect other adaptive power loading schemes, such as, for example, schemes that may vary modulation type, coding type and/or power allocation per subcarrier simultaneously. In one exemplary embodiment of the invention, the ITPC Detector may be realized in a Physical Layer (PHY) of an OFDM transceiver and may be controlled from a Medium Access Control (MAC) layer. The ITPC Detector may be a part of a first transceiver (e.g., station STA1 in FIG. 6), which may establish a connection with a second transceiver (e.g., station STA2 in FIG. 6) that may have an ITPC scheme such as, for example, the ITPC schemes described above.

Figure 6:
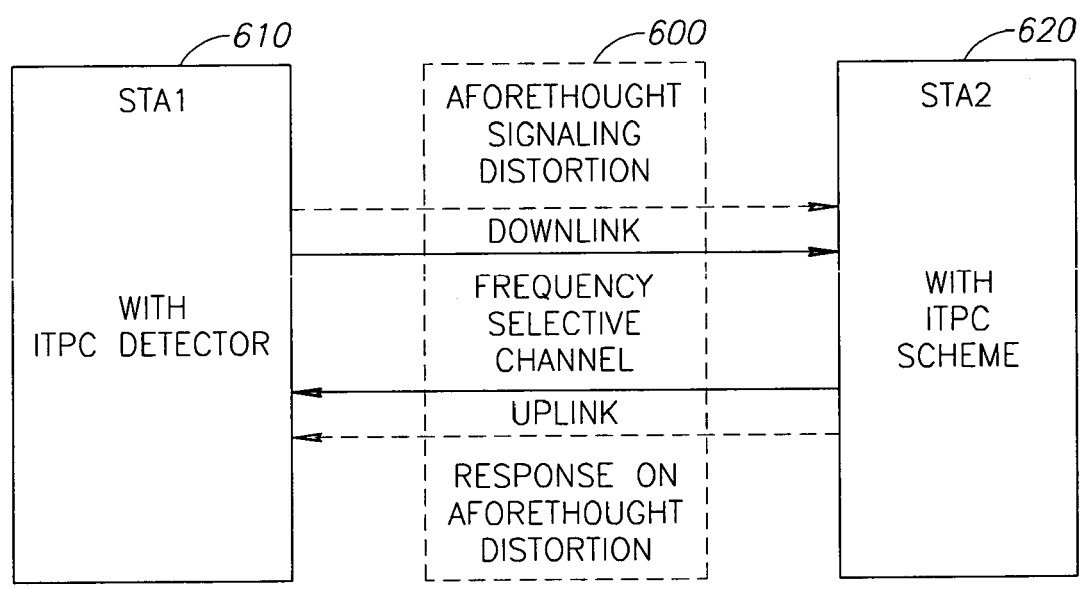
FIG. 6 is a schematic illustration of a communication system including an ITPC Detector in accordance with exemplary embodiments of the invention.

FIG. 6 schematically illustrates a communication system with an ITPC Detector in accordance with exemplary embodiments of the present invention. The system includes at least two stations, namely, station 610 (STA1) and station 620 (STA2), respectively, operating over a frequency-selective channel 600. In such a communication system, STA1 610 may include an ITPC Detector, while STA2 620 may include an ITPC scheme.

The method of detection used by the ITPC Detector may be active and may be based, for example, on aforethought distortion of the OFDM downstream signals of the TX part of station 610, following detection of upstream signal distortion of the TX part of station 620 by the ITPC Detector in station 610. The aforethought distortion of downstream signals and the frequency-selective channel distortion that follows may be perceived and estimated by the ITPC scheme in station 620, e.g., in terms of a transfer function of a "real" channel. The ITPC scheme in station 620 may automatically react, in a predefined way, to the aforethought distorted signal. The aforethought distortion may be estimated together with the channel transfer function using, for example, a standard channel estimation unit (276 in FIG. 2), because station 620 may not separate channel distortion and aforethought distortion. A SNR Pre-Equalizer in station 620 may recalculate channel estimates from a standard channel estimation unit (276 in FIG. 2), to provide subcarrier weights for a Subcarrier Weighting Unit (230 in FIG. 2) of station 620, in analogy to the description above with reference to FIG. 3. These estimations may be performed taking into account a total transfer function, which may be equal to the product of the aforethought distortion transfer function and a physical channel transfer function in the frequency domain. In the time domain, the total response function may be equal to the convolution of two response functions, for example, a response of the aforethought distortion and a response of the physical channel. It will be appreciated by persons skilled in the art, that the station under investigation (STA2), which may be using an ITPC scheme in accordance with some embodiments of the present invention, may not notice that the signal is pre-distorted. STA2 may operate as if a usual OFDM signal has passed through a specific channel, and therefore STA2 may attempt to pre-equalize the channel. This may result in a transmitted signal containing inverse aforethought pre-distortion, which may enable the ITPC Detector to detect activity of an ITPC scheme.

Subcarrier complex numbers may be obtained by a subcarrier modulation mapping unit in station 620. The subcarrier complex numbers may be multiplied by their corresponding subcarrier weights. This multiplication may be performed, for example, by a Subcarriers Weighting Unit of station 620. The weighted subcarrier complex numbers may be received by an IFFT unit, as is known in the art. The above process may result in pre-distortion of the subcarrier values, so as to compensate for future distortion of an estimated total transfer function during uplink. However, the pre-distortion may be incorrect, because the real physical channel transfer function may not coincide with the perceived total transfer function estimated by the RX part of station 620. The RX part of station 610 may receive its own inverted aforethought distortion instead of a perfectly equalized frequency-flat channel response. As explained above, station 610 may detect this response to its own aforethought distortion using matched filtering, which may be performed by the ITPC Detector of station 610.

Figure 7A:
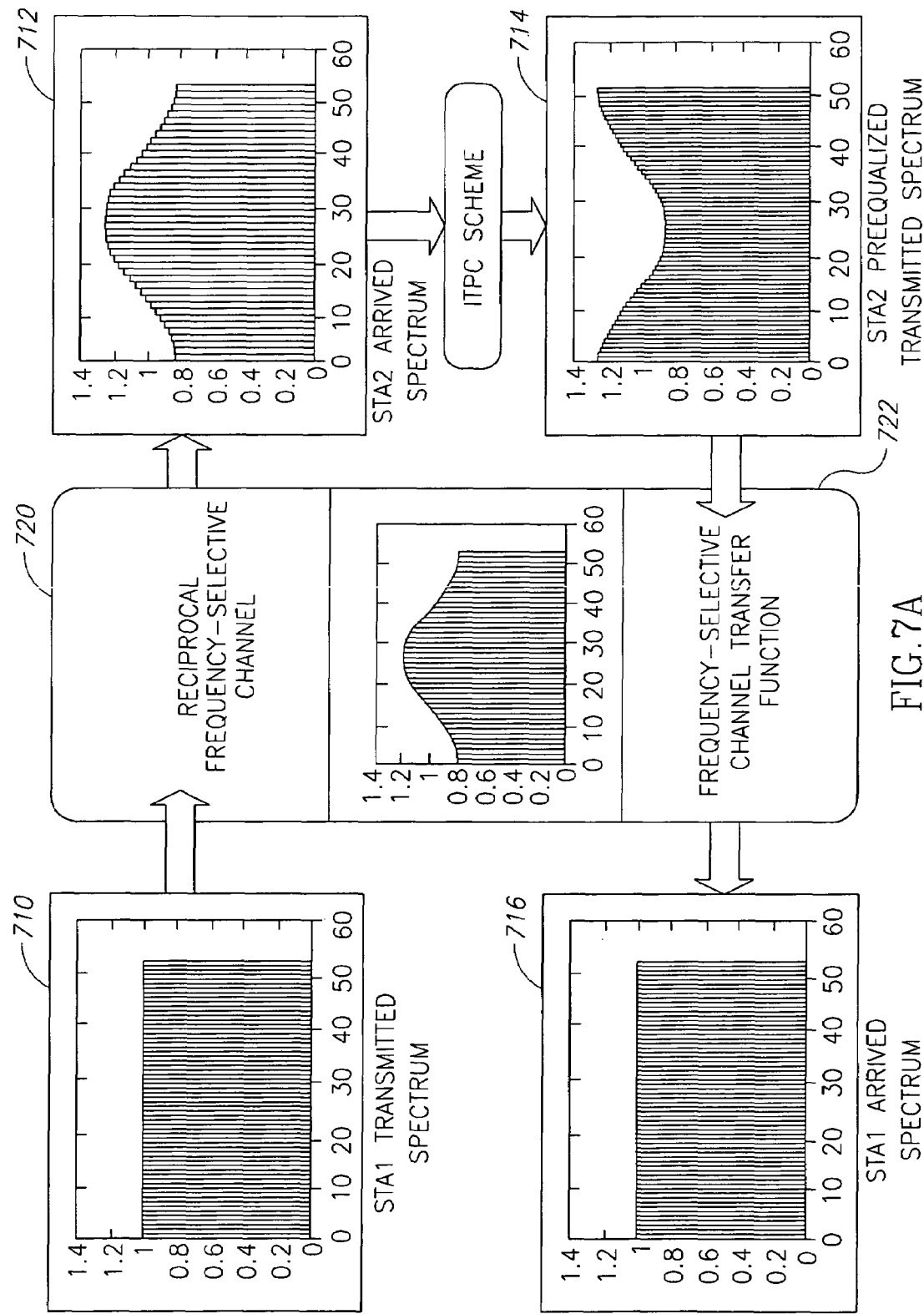
FIGS. 7A, 7B and 7C are subcarrier spectrum diagrams showing a detection process of upstream and downstream OFDM of two stations, in accordance with exemplary embodiments of the invention.
Figure 7B:
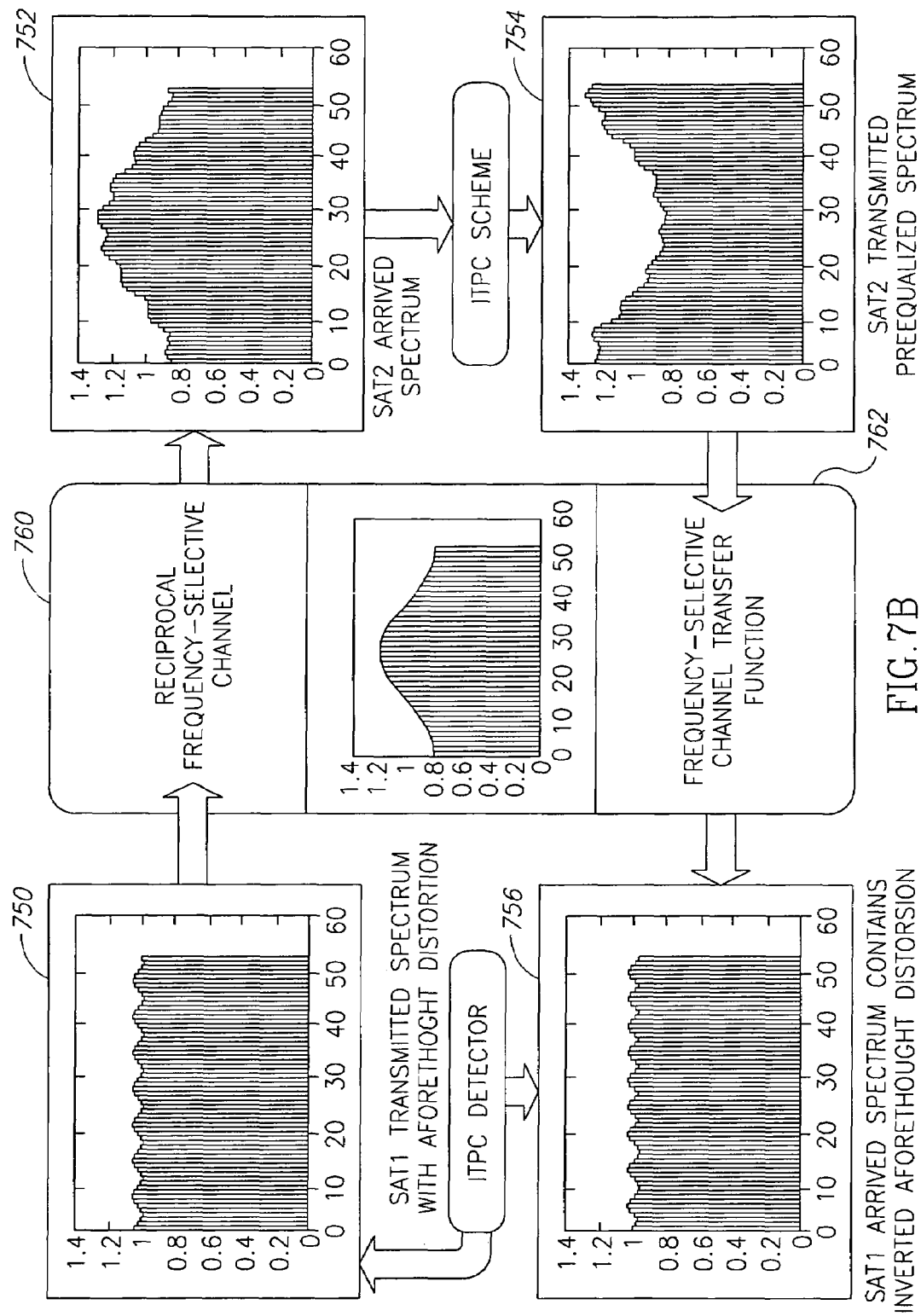
Figure 7C:
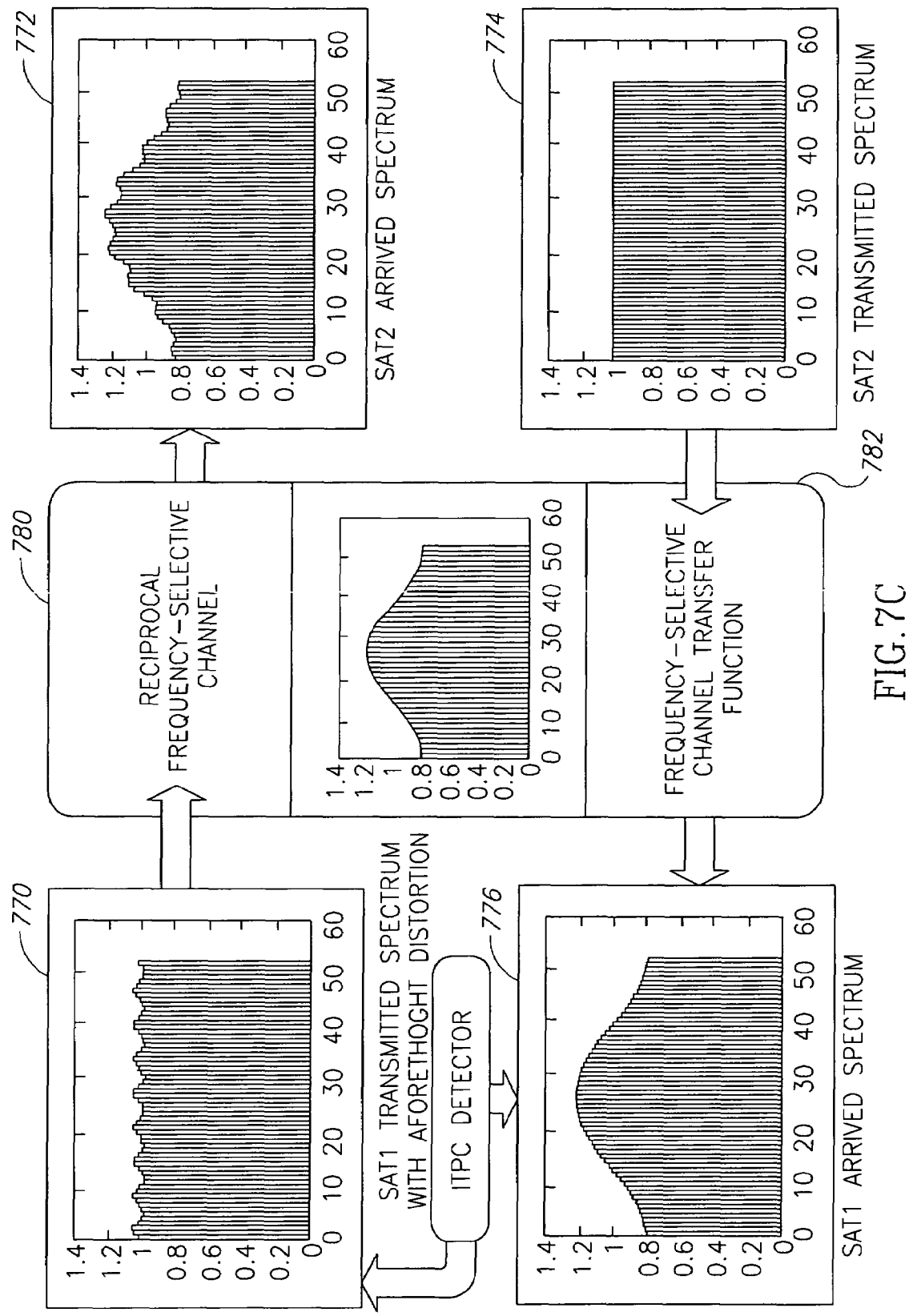

As depicted schematically in FIGS. 7A, 7B and 7C, a detection process in accordance with exemplary embodiments of the invention may be presented using upstream and downstream OFDM subcarrier spectrum diagrams of two stations, e.g., STA1 and STA2.

FIG. 7A schematically illustrates an example of using an ITPC scheme by STA2 upon connection with STA1, without a detection process. Block 710 depicts a spectrum that may be transmitted by STA1, while block 712 depicts a spectrum that may be received by STA2. Block 714 depicts a pre-equalized transmitted spectrum of STA2, and block 716 depicts a spectrum that may be received by STA1. As shown in FIG. 7A, STA1 and STA2 may operate over a reciprocal, frequency-selective channel 720, whose transfer function may be, for example, as indicated at block 722.

FIG. 7B schematically illustrates an exemplary detection of an ITPC scheme activity at STA2, by an ITPC Detector at STA1, in accordance with embodiments of the present invention. Block 750 depicts the spectrum transmitted by STA1 with aforethought distortion, while block 752 depicts the spectrum received STA2. Block 754 depicts a pre-equalized transmitted spectrum of STA2, and block 756 depicts the spectrum that may be received by STA1, which spectrum may contain inverted aforethought distortion. As shown in FIG. 7B, STA1 and STA2 may operate over a reciprocal, frequency-selective channel 760, whose transfer function may be, for example, as indicated at block 762.

FIG. 7C schematically illustrates an example of non-detection of ITPC scheme activity for a STA2 having a conventional OFDM transceiver. Block 770 depicts a spectrum with aforethought distortion that may be transmitted by station 610, while block 772 depicts the spectrum that may be received by station 620. Block 774 depicts the spectrum that may be transmitted by station 620, and block 776 depicts the spectrum received by station 610. As indicated in FIG. 7C, STA1 and STA2 may operate over a reciprocal frequency-selective channel 780, whose transfer function is indicated at block 782.

Figure 8A:
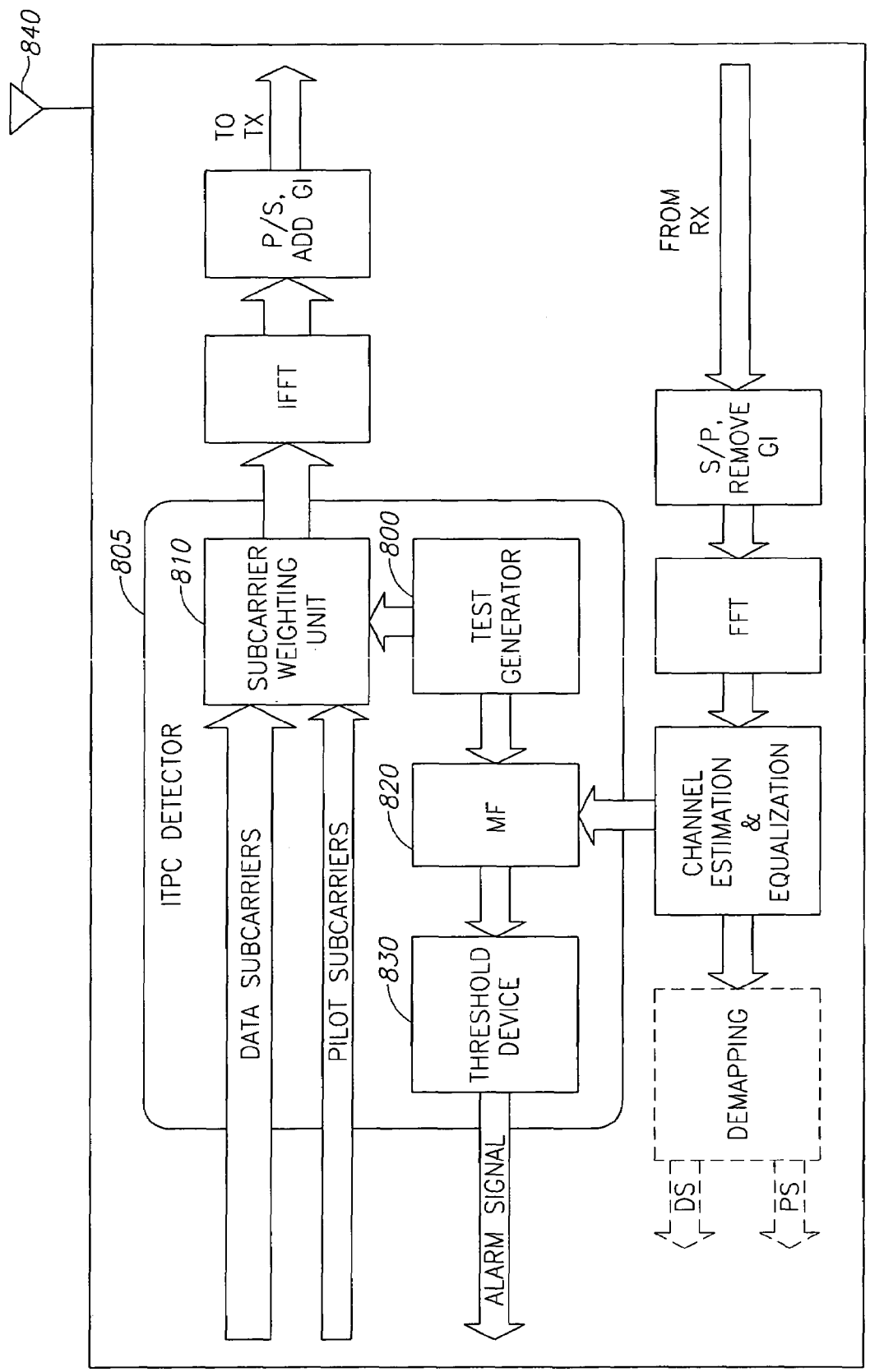
FIGS. 8A and 8B are schematic functional block diagrams of two, respective, exemplary implementations of ITPC Detector schemes in accordance with embodiments of the invention.
Figure 8B:
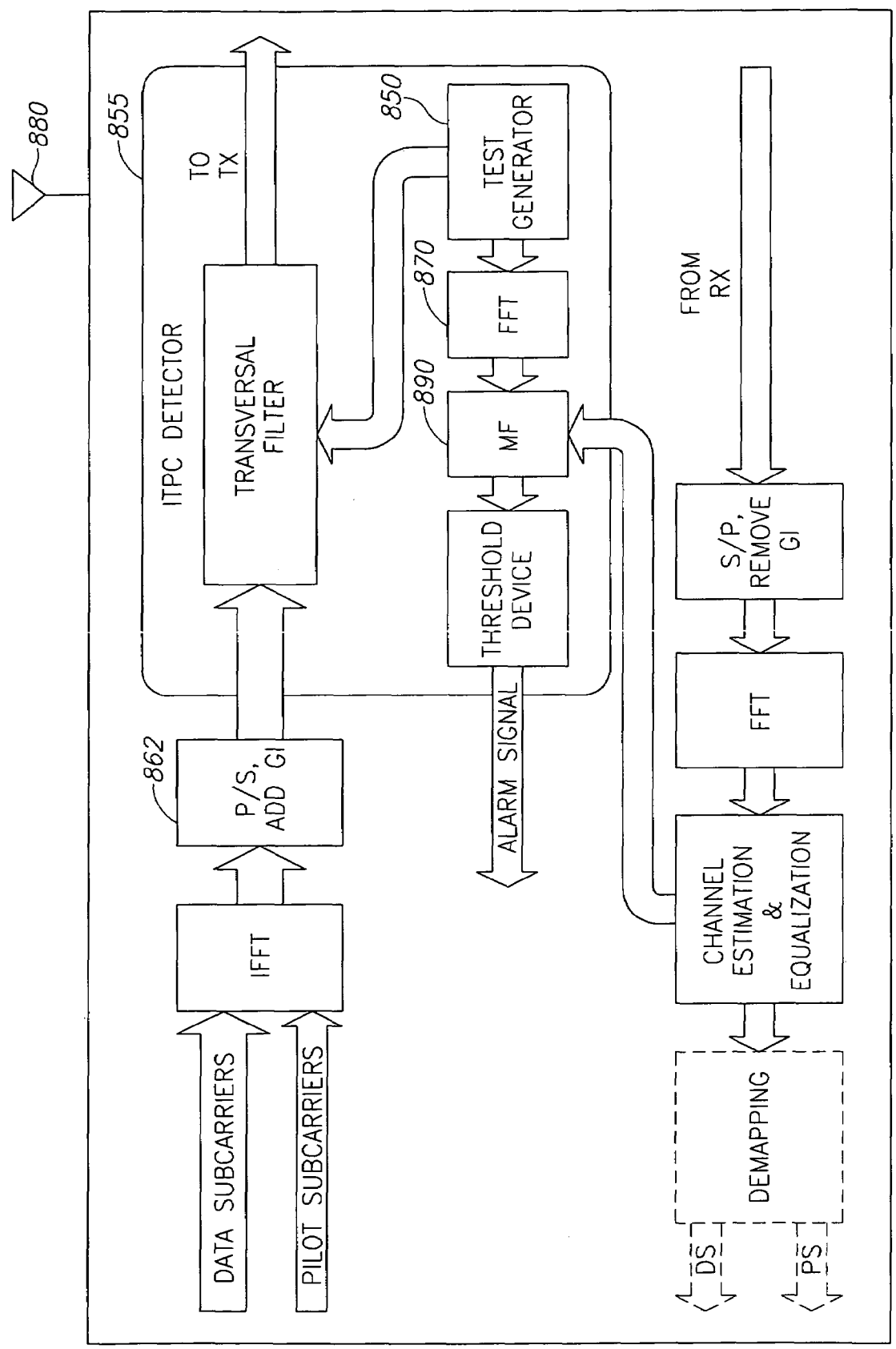

An ITPC Detector, which may be used in conjunction with OFDM signals, may include three main units: a Test Generator; an Aforethought Distortion Unit; and a Detection Sub-unit. Each one of these units may be implemented in a time domain and/or a frequency domain. FIGS. 8A and 8B illustrate two exemplary implementations of ITPC Detector schemes in accordance with embodiments of the invention.

FIG. 8A schematically illustrates part of a station/transceiver including an ITPC Detector 805 in accordance with one exemplary embodiment of the present invention, including components implemented in the frequency domain. The ITPC Detector 805 of FIG. 8A may include a Test Generator 800 to produce a predefined test signal in the frequency domain, wherein complex weights may be close to real units because the expected aforethought distortion in this case may be small. These complex weights may be used as input signals for an Aforethought Distortion Unit, which may be implemented, for example, in the form of a Subcarriers Weighting Unit 810, wherein subcarrier complex numbers from a modulation mapping block may be multiplied by corresponding weights, which may be provided by test signals produced by Test Generator 800. It is noted that to satisfy total transmitter power requirements, the sum of the squares of the subcarrier weight magnitudes may be constant and equal to the number of subcarriers, if desired. Next, weighted subcarrier complex numbers may be transferred to an IFFT unit, as is known in the art, and further processed using any suitable components for processing OFDM TX downstream signals. The ITPC Detector 805 may further include a Detection Sub-Unit (not shown), which may include a Matched Filter 820 operating in the frequency domain and a Threshold Device 830. Matched Filter 820 may be implemented using either complex or real coefficients, depending, e.g., on affordable implementation complexity and/or any other technical/economic specification and/or design requirements. In accordance with one exemplary embodiment of the present invention, the magnitudes of subcarrier fading gain estimates, which may be provided by at least one training symbol, for example, a long training symbol processed by a standard OFDM channel estimation unit, may be used as input to the frequency domain Matched Filter 820, with real coefficients. In this an exemplary embodiment, Matched Filter 820 coefficients may include real values inversely proportional to magnitudes of corresponding weights provided by Test Generator 800. The output of Matched Filter 820 may be received as input by Threshold Device 830. Further, for a predetermined false alarm probability, the ITPC Detector 805 may detect activity of the ITPC scheme of STA2 by utilizing a Neyman-Pearson criterion to detect Matched Filter 820 response above a predetermined threshold. The station including the ITPC Detector 805 described above may include any additional circuit components of transceivers, as are known in the art, to enable the station to transmit and receive signals from a communication system using an internal and/or external Antenna 840, as is known in the art.

Figure 9:
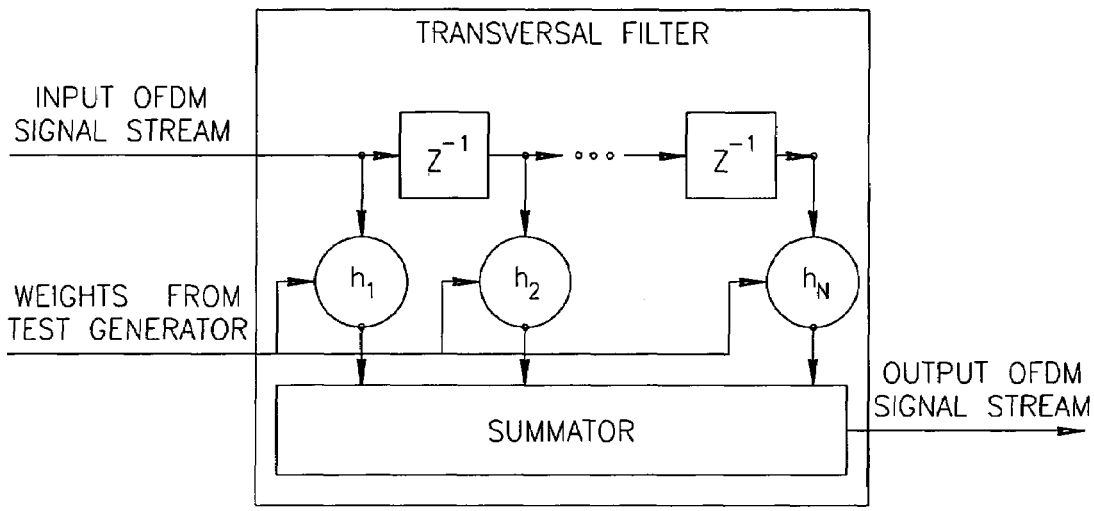
FIG. 9 is a schematic functional block diagram of a Transversal Filter, which may be included in an exemplary implementation of an ITPC Detector in accordance with exemplary embodiments of the invention.

Reference is now made to FIG. 8B, which schematically illustrates another exemplary embodiment of a station/transceiver including an ITPC Detector 855 in accordance with embodiments of the present invention, and to FIG. 9, which schematically illustrates a functional scheme of a Transversal Filter, which may be included in exemplary implementations of ITPC Detector 855. In this exemplary embodiment, components may be implemented in the time domain, except a Matched Filter 890, which may be implemented in the frequency domain, as described above with reference to the embodiment of FIG. 8A. The ITPC Detector 855 of FIG. 8B may include a test Generator 850, which may produce a predefined test signal in the time domain, including, for example, real and/or complex weights, e.g., with magnitudes of less than one, because the aforethought distortion may be small, as described above. These complex weights may be used as input signals in an Aforethought Distortion Unit, which may be implemented in the form of a time domain Transversal Filter 860, which may receive a signal from a Parallel-to-Serial Converter and/or a Guards Intervals (GI) adding unit, as indicated at block 862. Input signals of the Transversal Filter 860 may represent an entire time domain OFDM input stream. Transversal Filter 860 may introduce aforethought distortion using a taped delay line with predetermined weights, e.g., the weights received from Test Generator 850, and a summation scheme as illustrated in more detail in FIG. 9. In order to avoid adversely affecting the data transmission quality by the aforethought distortion, the total response time of Transversal Filter 860 (illustrated in detail in FIG. 9) and the physical channel may not be longer than the GI duration of the OFDM symbol. For example, in communications in accordance with standard 802.11a, the GI duration is typically equal to 16 samples, or approximately 800 nanoseconds. It is further noted that in order to satisfy total transmitter power requirements, the sum of the squares of the coefficients in Transversal Filter 860 may also be equal to one, in normalized values. The Detection Sub-Unit (not shown) in accordance with this exemplary embodiment of the invention may be generally similar to the Detection Sub-unit described above with reference to FIG. 8A; however, in this exemplary embodiment, Matched Filter coefficients may be recalculated from a time domain signal of Test Generator 850 by an FFT unit 870, which may be used to convert the time domain signal to a frequency domain signal. The station including the ITPC Detector 855 described above may include any additional circuit components of transceivers, as are known in the art, to enable the station to transmit and receive signals from a communication system using an internal and/or external Antenna 880, as is known in the art.

In the two exemplary embodiments of ITPC Detector described above, with reference to FIGS. 8A and 8B, implementation of some embodiments of the invention may use either subcarrier complex fading gain estimates and/or a matched filter with complex coefficients, in order to improve detection efficiency. Further, the ITPC Detector may include a storage device, which may allow accumulating Matched Filter responses for several consecutive packets from STA2. The detection efficiency may also be dependent on the precision of channel estimates.

As an example of detection efficiency in accordance with some embodiments of the present invention, Matlab(R) simulation results were performed for reciprocal two-ray (with inter-ray delay of 50 nanoseconds and relative power of −15 dB), static, frequency-selective channel model. The channel was benign, with a channel deviation value of D=3 dB. In such a simulation, the ITPC Detector was implemented in the frequency domain, in accordance with the exemplary embodiment illustrated schematically in FIG. 8A. The simulation used two long training symbols, in accordance with standard OFDM 802.11a, for channel transfer function ML estimation. For detection of ITPC scheme activity, the aforethought distortion was −25 dB, with a complex exponential form. This distortion in the frequency domain may be equivalent to a time domain distortion produced by a transversal filter with the following real coefficients: $h_n$=[0.984, 0, 0, 0, 0, 0, 0, 0, 0, 0.055, 0, . . . , 0]. The Matched Filter was implemented in the frequency domain, with coefficients substantially complex-conjugate to the back response of the aforethought distortion. The characteristics of the ITPC Detectors obtained in this simulation were as follows: for SNR=17 dB and false alarm probability $P_{FA}$=0.01, the probability of correct detection was $P_D$=0.97 It is noted that the above description relates only to an exemplary simulation of an embodiment of the invention, and is not intended to limit the scope of the present invention in any way. Detection results may differ, and detection efficiency may be lower or higher, in other simulations or in actual implementations of the ITPC detector in accordance with some embodiments of the present invention.

Figure 10:
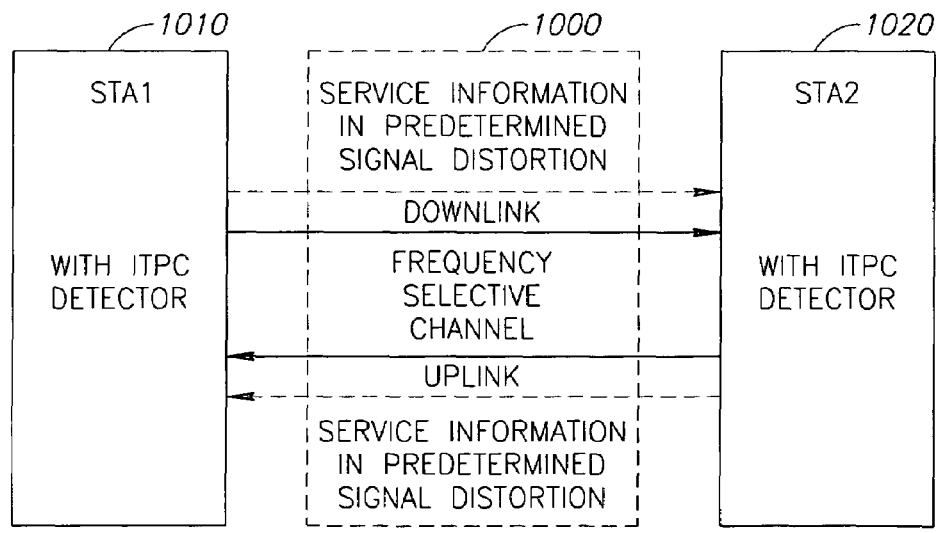
FIG. 10 is a schematic illustration of a communication system including two ITPC Detectors/Transceivers in accordance with exemplary embodiments of the invention.

As depicted schematically in FIG. 10, an aforethought distortion of an OFDM signal may be used for transmission of service information, without adversely affecting the main OFDM data streams, when both stations, e.g., STA1 and STA2, may be used as ITPC transceivers and include ITPC detectors. FIG. 10 schematically illustrates an exemplary embodiment of such a transmission system in accordance with embodiments of the present invention. Each one of stations 1010 (STA1) and 1020 (STA2) may include an ITPC detector. Stations 1010 and 1020 may operate over a frequency-selective channel 1000, and both stations may have a priori information of a set of Test Generator signals, which may be referred to as "codewords".

Codewords may be defined as certain combinations of weights in the frequency and/or time domain. As illustrated schematically in FIG. 9, in the time domain, a codeword may be represented by a given set of transversal filter complex coefficients, which may be denoted $\{h_{1i}, h_{2i}, \ldots, h_{Ni}\}$. The following exemplary calculations have been performed based on standard 801.11a parameters with a sample time of 50 nanoseconds and an OFDM Guard Interval of 16 samples (800 nanoseconds). For instance, a set of codewords may be chosen in accordance with a channel average power delay profile and/or technical specifications and constraints. As an example for typical indoor channels, a channel response time delay usually does not exceed about 250 nanoseconds, or 5 samples, and therefore nonzero values of Transversal Filter coefficients $h_n$ may be preferable for the positions of $6<n<10$, if desired, although the scope of the invention is not limited in this respect.

To further explain this example, it will be appreciated by persons skilled in the art, that a Transversal Filter may produce delayed copies of an original signal. Values of coefficients of the Transversal Filter may correspond to magnitudes of such copies, and the number of particular coefficient may determine the delay of a corresponding copy. However, the channel may also produce copies of the signal due to multi-path propagation (e.g., channel response). In this example, if the delays corresponding to positions of Transversal Filter nonzero coefficients are less then the channel response time (e.g., $n<5$), there may be interference between responses from the Transversal Filter and the channel responses, that may affect the detection and/or transmission of service information performance. If Transversal Filter responses delays are larger than the difference between OFDM Guard Interval and channel response time (e.g., $n>10$), then the Transversal Filter responses delayed by the channel may cause unwanted inter-symbol interference because the total delay may exceed the OFDM Guard Interval value. It is noted that the magnitudes of the coefficients described above may be relatively small, for example, in the range of about −20 dB to −25 dB, in order to have only a negligible impact on the OFDM system power allocation and the BER/PER performance characteristics. An ITPC Detector scheme with such a special Test Generator may be referred to as "ITPC Transceiver".

Any of the stations, e.g., STA1 or STA2, may transmit service information using its Aforethought Distortion Unit, and/or may receive service information from another station using its Detection Unit. In an exemplary embodiment of the present invention, service information may be extracted by using a standard channel estimation unit and one or two long training symbols processing. The performance characteristics of such transmission for a set of simple codewords, e.g., with one nonzero transversal filter coefficient, $h_n$, may be similar to the characteristics of an ITPC Detector as described above. However, optimizing the selection of a set of codewords, using a suitable scheme or in accordance with suitable criteria, may substantially improve the service information throughput.

In some exemplary embodiments of the present invention, in regard to extraction of service information, a dedicated high precision channel estimation unit may be used by an ITPC Detector, or included in the ITPC Detector. This dedicated high precision channel estimation unit may process an entire OFDM data packet, in order to improve performance of transmission of service information.

Yet another method for improvement of service information throughput over a standard OFDM signal stream, in accordance with embodiments of the present invention, includes using an ITPC scheme simultaneously with an ITPC transceiver, wherein the ITPC scheme may equalize the physical channel transfer function, and the transceiver may transmit more service information through a pre-equalized channel.

Although the scope of the present invention is not limited in this respect, it is noted that by using an ITPC Detector in accordance with embodiments of the present invention, the following benefits may be obtained:

(a) An ITPC Detector may be a multi-purpose device, which may be used for detection of ITPC activity and/or for service information transmission.

(b) Aforethought distortions used in an ITPC Detector may suit the structure and functionality of OFDM systems. Therefore, an ITPC Detector may not affect the OFDM system performance in both the detection and transmission regimes.

(c) Low complexity and high efficiency of an ITPC Detector, in both detection and service information transmission systems, may allow using an ITPC Detector strictly in an OFDM IEEE standard 802.11a framework.

Embodiments of the present invention may be implemented by software, by hardware, or by any combination of software and/or hardware as may be appropriate for specific applications or in accordance with specific design requirements. In some embodiments of the invention, the system of the invention may further include memory units, buffers and/or registers for temporary and/or permanent storage of data, as well as general, multi-purpose and/or specific processors, circuits, logic systems, operators, circuitry, blocks, units and/or sub-units that may perform any operation, or any combination of operations, described above. Such units, or any combination thereof, may be noted herein as "circuitry", and may be external and/or internal to a communication device, in whole or in part.

Embodiments of the invention may include an article comprising a storage medium having stored thereon instruction that, when executed by a processing platform, result in allocating transmission power to a communication station based on multiplying each of at least one transmitted subcarrier complex number, in a plurality of subcarriers, by a corresponding subcarrier weight The instructions may result in estimating fading gains of a plurality of subcarriers. An embodiment of the invention may include an article including a storage medium having stored thereon instruction that, when executed by a computer platform, result in multiplying at least one complex number of a transmitted subcarrier by a corresponding weight based on a test signal; and detecting use of a power allocation scheme based on a response to a test signal in a received subcarrier. The instructions may result in detecting result in accumulating matched filter responses for at least two data packets of the received subcarrier. The instructions may result in extracting service information from the received subcarrier. The instructions may result in transmitting service information in the transmitted subcarrier. The instructions may result in transmitting the service information result in transmitting the service information through a channel. The instructions may result in pre-equalizing a channel. The instructions may result in processing a data packet of the received subcarrier.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
receiving a signal transmitted over subcarriers;
estimating power gains of said subcarriers from said received signal;
determining a channel deviation of said subcarriers;
providing a modulated signal for transmission over said subcarriers;
calculating subcarrier weights for said modulated signal, wherein said subcarrier weights are inversely proportional to said estimated power gains if said channel deviation is equal to or less than a predetermined threshold, and wherein said subcarrier weights are substantially all units if said channel deviation is greater than said predetermined threshold, and wherein said subcarrier weights are calculated so that the total transmission power remains substantially constant; and
weighting said modulated signal with said subcarrier weights.

2. The method of claim 1, wherein a sum of the squares of the magnitude of said subcarrier weights is constant and equal to the number of said subcarriers.

3. The method of claim 1, comprising:
predicting long-range channel changes in said estimated power gains; and
modifying said subcarrier weights based on said predicted long-range channel changes.

4. The method of claim 1, wherein said subcarrier weights are based on estimated fading gains of said subcarriers.

5. The method of claim 1, wherein said subcarrier weights are based on estimated inverse fading gains of said subcarriers.

6. The method of claim 1, comprising transmitting said weighted modulated signal.

7. A method comprising:
providing a modulated signal for transmission over subcarriers;
generating a test signal having weights defining aforethought distortion;
weighting said modulated signal with said weights of said test signal to provide an aforethought distorted signal;
transmitting said aforethought distorted signal to a station over said subcarriers;
receiving a signal transmitted by said station over said subcarriers after said step of transmitting;
filtering said received signal with weights inversely proportional to said weights of said test signal to provide a filtered signal;
determining said received signal contains inverted aforethought distortion if said filtered signal is above a predetermined threshold and determining said received signal does not contain inverted aforethought distortion if said filtered signal is equal to or below said predetermined threshold; and
storing said determination.

8. The method of claim 7, wherein said test signal is a frequency domain signal and said weights of said test signal are complex weights close to real units.

9. The method of claim 7, wherein said test signal is a time domain signal and said weights of said test signal are real and complex weights less than one.

10. The method of claim 7, wherein said weighting is performed by multiplying modulation values of said modulated signal with said weights of said test signal.

11. The method of claim 7, wherein said weighting is performed by a transversal filter having a tapped delay line, wherein the input to said traversal filter is said modulated signal and the weights of said tapped delay line are said weights of said test signal.

12. The method of claim 7, comprising extracting service information from the received signal.

13. A wireless communication device, comprising:
a receiver to receive a signal transmitted over subcarriers;
a channel estimation and equalization unit to estimate power gains of said subcarriers from said received signal;
a channel deviation estimator to determine a channel deviation of said subcarriers;
a subcarrier modulation mapping unit to provide a modulated signal for transmission over said subcarriers;
a subcarrier weights calculating unit to calculate subcarrier weights for said modulated signal, wherein said subcarrier weights are inversely proportional to said estimated power gains if said channel deviation is equal to or less than a predetermined threshold, and wherein said subcarrier weights are substantially all units if said channel deviation is greater than said predetermined threshold, and wherein said subcarrier weights are calculated so that the total transmission power remains substantially constant; and
a subcarriers weighting unit to weight said modulated signal with said subcarrier weights.

14. The wireless communication device of claim 13, comprising:
a long range channel prediction unit for predicting long-range channel changes in said estimated power gains, wherein
said subcarrier weights calculating unit is for modifying said subcarrier weights based on said predicted long-range channel changes.

15. The wireless communication device of claim 13, comprising:
a transmitter for transmitting said weighted modulated signal.

16. The wireless communication device of claim 13, comprising:
an antenna for transmitting and receiving wireless communications.

17. A wireless communication device comprising:
a subcarrier modulation mapping unit to provide a modulated signal for transmission over subcarriers;
a test generator to generate a test signal having weights defining aforethought distortion;
a subcarriers weighting unit to weight said modulated signal with said weights of said test signal to provide an aforethought distorted signal;
a transmitter to transmit said aforethought distorted signal to a station over said subcarriers;

a receiver to receive a signal transmitted by said station over said subcarriers after said step of transmitting;

a filter to filter said received signal with weights inversely proportional to said weights of said test signal to provide a filtered signal;

a threshold device to determine said received signal contains inverted aforethought distortion if said filtered signal is above a predetermined threshold and to determine said received signal does not contain inverted aforethought distortion if said filtered signal is equal to or below said predetermined threshold; and a storage device to store said determination.

18. The wireless communication device of claim 17, wherein said test signal is a frequency domain signal and said weights of said test signal are complex weights close to real units.

19. The wireless communication device of claim 17, wherein said test signal is a time domain signal and said weights of said test signal are real and complex weights less than one.

20. The wireless communication device of claim 17, wherein said weighting is performed by multiplying modulation values of said modulated signal with said weights of said test signal.

21. The wireless communication device of claim 17, wherein said weighting is performed by a transversal filter having a tapped delay line, wherein the input to said traversal filter is said modulated signal and the weights of said tapped delay line are said weights of said test signal.

22. The wireless communication device of claim 17, comprising an extractor for extracting service information from the received signal.

23. The wireless communication device of claim 17, comprising:

an antenna for transmitting and receiving wireless communications.

\* \* \* \* \*